(12) United States Patent
Anderson

(10) Patent No.: US 10,314,434 B1
(45) Date of Patent: Jun. 11, 2019

(54) FOOT-OPERATED GRILL COVER LIFTING APPARATUS

(71) Applicant: Arlene Anderson, Tinton Falls, NJ (US)

(72) Inventor: Arlene Anderson, Tinton Falls, NJ (US)

( * ) Notice: Subject to any disclaimer, the term of this patent is extended or adjusted under 35 U.S.C. 154(b) by 397 days.

(21) Appl. No.: 15/162,796

(22) Filed: May 24, 2016

(51) Int. Cl.
A47J 37/07 (2006.01)
F16H 21/44 (2006.01)

(52) U.S. Cl.
CPC .......... A47J 37/0786 (2013.01); F16H 21/44 (2013.01)

(58) Field of Classification Search
CPC ............... F16H 21/44; A47J 37/0786
USPC .................................. 126/25 R, 286
See application file for complete search history.

(56) References Cited

U.S. PATENT DOCUMENTS

| | | | | |
|---|---|---|---|---|
| 1,928,571 A * | 9/1933 | Petit | ........................ | A22C 11/00 366/191 |
| 2,155,548 A * | 4/1939 | Hompesch | ............. | A47K 13/10 4/246.3 |
| 2,663,529 A * | 12/1953 | Lyttaker | ................ | B65F 1/1421 220/264 |
| 3,208,706 A * | 9/1965 | Clark | ....................... | B65F 1/141 248/147 |
| 4,577,262 A * | 3/1986 | Buteaux | ................... | B63C 9/22 200/60 |
| 5,348,222 A * | 9/1994 | Patey | ...................... | B65F 1/006 220/262 |
| 5,778,705 A * | 7/1998 | Lee | .......................... | D06F 39/14 68/12.26 |
| 6,581,587 B1 | 6/2003 | Helms | | |
| 6,789,537 B1 | 9/2004 | Lutz et al. | | |
| 7,281,277 B1 * | 10/2007 | Uchida | ................... | A47K 13/10 4/246.1 |
| 7,392,804 B2 | 7/2008 | Lockhart | | |
| 7,755,004 B2 * | 7/2010 | Collene | ................. | F24C 15/023 126/192 |
| 8,214,933 B1 * | 7/2012 | Gaudin | ................... | A47K 13/10 4/246.1 |
| 2005/0044819 A1 * | 3/2005 | Chomik | .................... | B65B 7/12 53/459 |
| 2006/0102165 A1 * | 5/2006 | Lockhart | ................. | A47J 36/12 126/192 |
| 2008/0257331 A1 * | 10/2008 | Lockhart | ................. | A47J 36/12 126/192 |
| 2009/0250463 A1 * | 10/2009 | Van Risseghem | ...... | B65F 1/163 220/263 |
| 2012/0180207 A1 * | 7/2012 | Murillo | .................. | A47K 13/10 4/246.1 |
| 2013/0032597 A1 * | 2/2013 | Anderson | ............ | B65F 1/1468 220/324 |

(Continued)

Primary Examiner — Avinash A Savani

(57) ABSTRACT

A foot-operated grill cover lifting apparatus including a rectangular hollow base unit, a slot vertically disposed on a front side of the base unit, and an aperture disposed on a top side of the base unit. A lever rod has a top end attached to a left side of a cover of a grill and a bottom end disposed through the aperture. A coupling lever arm is disposed within the base unit, with the coupling lever arm having a front end and a back end rotatably attached to the bottom end of the lever rod. A spring-loaded foot pedal has a front foot portion and a rearwardly extended support rod disposed through the slot and rotatably attached to the front end of the coupling lever arm.

3 Claims, 4 Drawing Sheets

(56) References Cited

U.S. PATENT DOCUMENTS

2017/0174428 A1* 6/2017 Muir ................... B65F 1/163

* cited by examiner

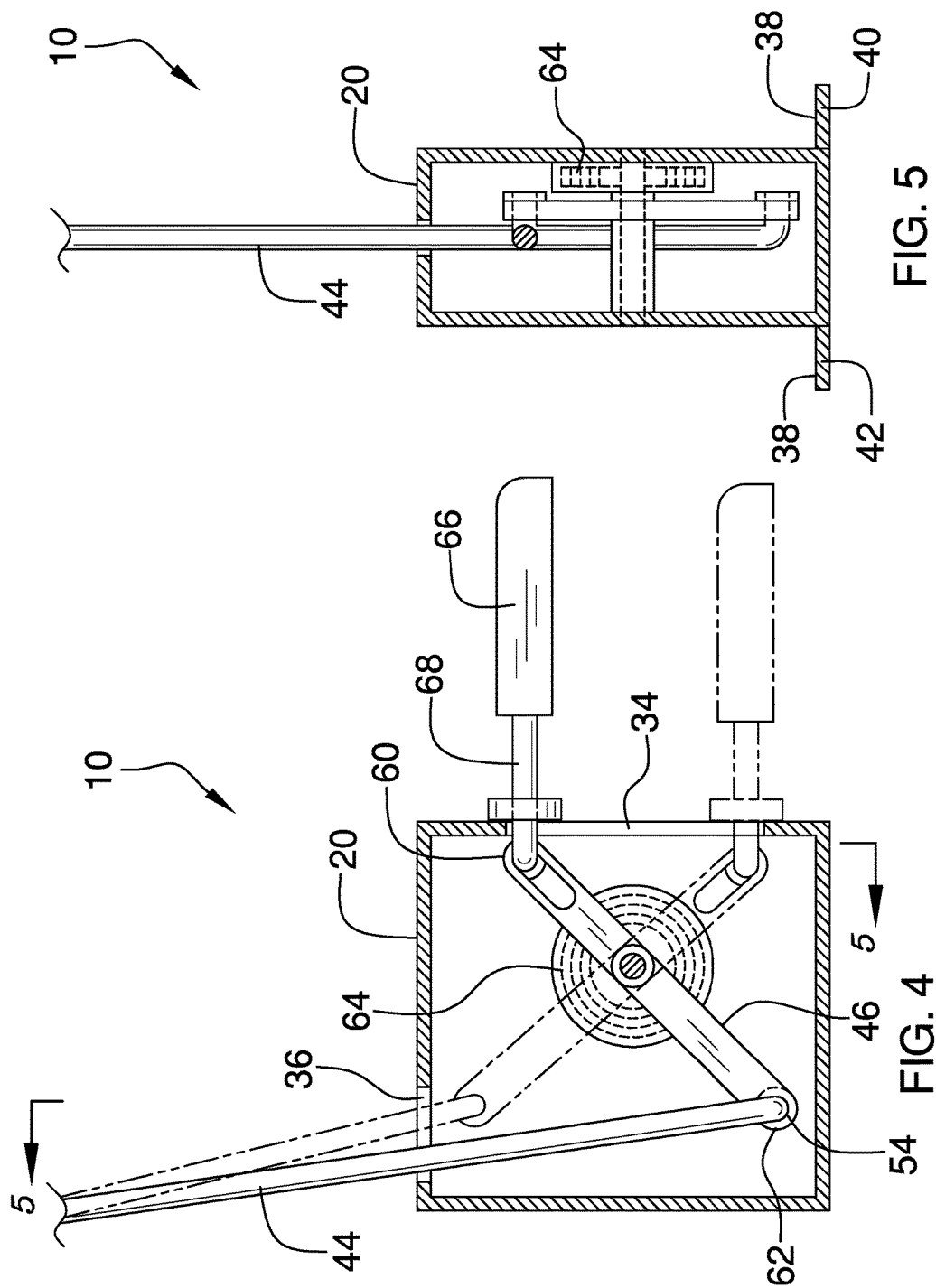

FOOT-OPERATED GRILL COVER LIFTING APPARATUS

BACKGROUND OF THE INVENTION

Various types of grill cover lifting apparatuses are known in the prior art. However, what has been needed is a foot-operated grill cover lifting apparatus including a rectangular hollow base unit, a slot vertically disposed on a front side of the base unit, and an aperture disposed on a top side of the base unit. What has been further needed is a lever rod and a coupling lever arm, with the lever rod having a top end attached to a left side of a cover of a grill and a bottom end disposed through the aperture, and the coupling lever arm disposed within the base unit and having a front end and a back end rotatably attached to the bottom end of the lever rod. Lastly, what has been needed is a spring-loaded foot pedal having a front foot portion and a rearwardly extended support rod disposed through the slot and rotatably attached to the front end of the coupling lever arm. The front foot portion of the spring-loaded foot pedal is configured to lower the front end of the coupling lever arm and raise the back end of the coupling lever arm while simultaneously extending the lever rod upwards in order to raise the cover of the grill when a foot of a user downwardly depresses the front foot portion of the spring-loaded foot pedal. The foot-operated grill cover lifting apparatus thus allows a user to utilize his foot to open a cover of a grill, thereby preventing hot smoke and flames from blowing in his face while he is opening the grill with his hands.

FIELD OF THE INVENTION

The present invention relates to grill cover lifting apparatuses, and more particularly, to a foot-operated grill cover lifting apparatus.

SUMMARY OF THE INVENTION

The general purpose of the present foot-operated grill cover lifting apparatus, described subsequently in greater detail, is to provide a foot-operated grill cover lifting apparatus which has many novel features that result in a foot-operated grill cover lifting apparatus which is not anticipated, rendered obvious, suggested, or even implied by prior art, either alone or in combination thereof.

To accomplish this, the present foot-operated grill cover lifting apparatus includes a rectangular hollow base unit having a top side, a bottom side, a right side, a left side, a front side, and a back side. A slot is vertically disposed on the front side of the base unit, and an aperture is disposed on the top side of the base unit proximal the back side. A pair of rectangular base support members includes a right base support member and a left base support member, with each of the right base support member and the left base support member disposed on each of the right side and the left side, respectively, of the base unit immediately adjacent to the bottom side. Each of the right base support member and the left base support member is perpendicularly disposed to each of the right side and the left side of the base unit. A length of each of the base support members is equal to a length of each of the right side and the left side of the base unit from the front side to the back side.

The foot-operated grill cover lifting apparatus further includes a lever rod and a coupling lever arm. The lever rod has a top end attached to a left side of a cover of a grill proximal a bottom edge of the cover and a bottom end disposed through the aperture. The lever rod is optionally disposed through an opening within a left side table of the grill. The coupling lever arm is disposed within the base unit, with the coupling lever arm having a front end and a back end rotatably attached to the bottom end of the lever rod. The base unit is structured to protect the coupling lever, and the pair of base support members are configured to provide additional structural support to the base unit.

A spring-loaded foot pedal, optionally substantially rectangular, has a front foot portion and a rearwardly extended support rod disposed through the slot and rotatably attached to the front end of the coupling lever arm. The front foot portion of the spring-loaded foot pedal is configured to lower the front end of the coupling lever arm and raise the back end of the coupling lever arm while simultaneously extending the lever rod upwards in order to raise the cover of the grill when a foot of a user downwardly depresses the front foot portion of the spring-loaded foot pedal. The spring-loaded foot pedal is configured to automatically return to its original position when pressure from the foot of the user on the front foot portion of the spring-loaded foot pedal is released.

Thus has been broadly outlined the more important features of the present foot-operated grill cover lifting apparatus so that the detailed description thereof that follows may be better understood and in order that the present contribution to the art may be better appreciated.

BRIEF DESCRIPTION OF THE DRAWINGS

Figures

FIG. 4 is a cross-sectional view taken along line 4-4 of FIG. 1.

FIG. 5 is a cross-sectional view taken along line 5-5 of FIG. 4.

DETAILED DESCRIPTION OF THE DRAWINGS

Figure 1:
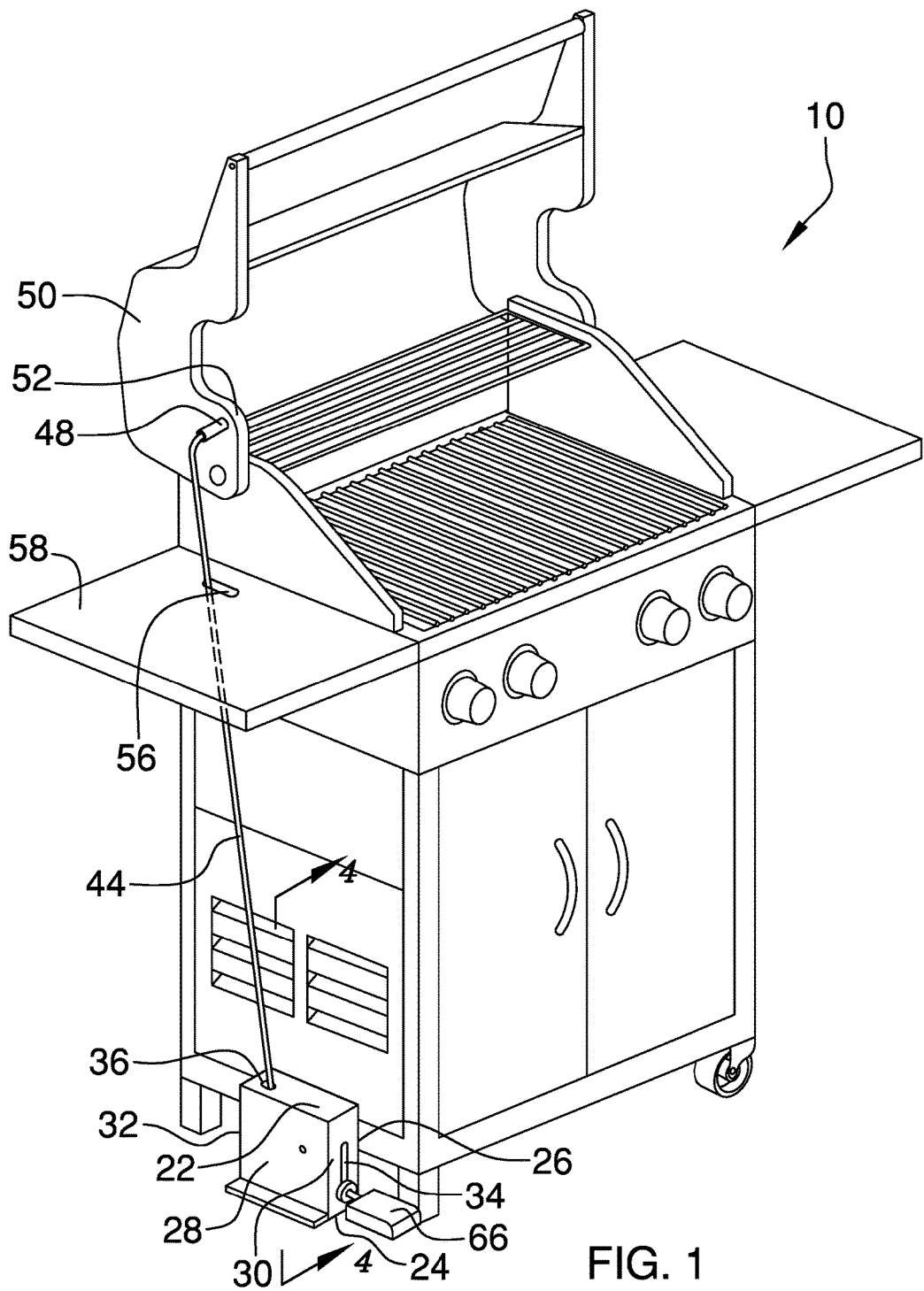
FIG. 1 is a front isometric view.
Figure 2:
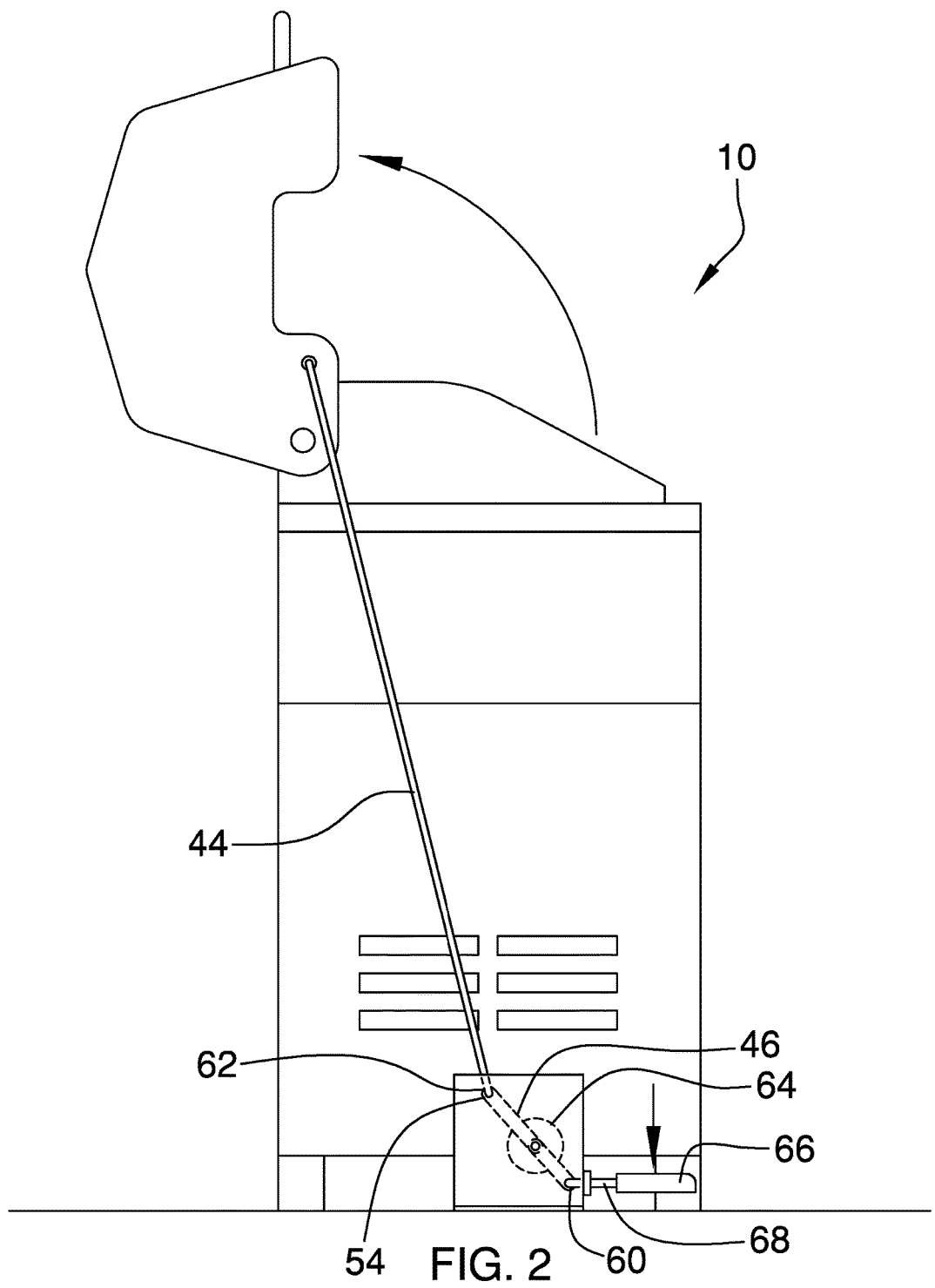
FIG. 2 is a side elevation view showing a cover of a grill in an open position.
Figure 3:
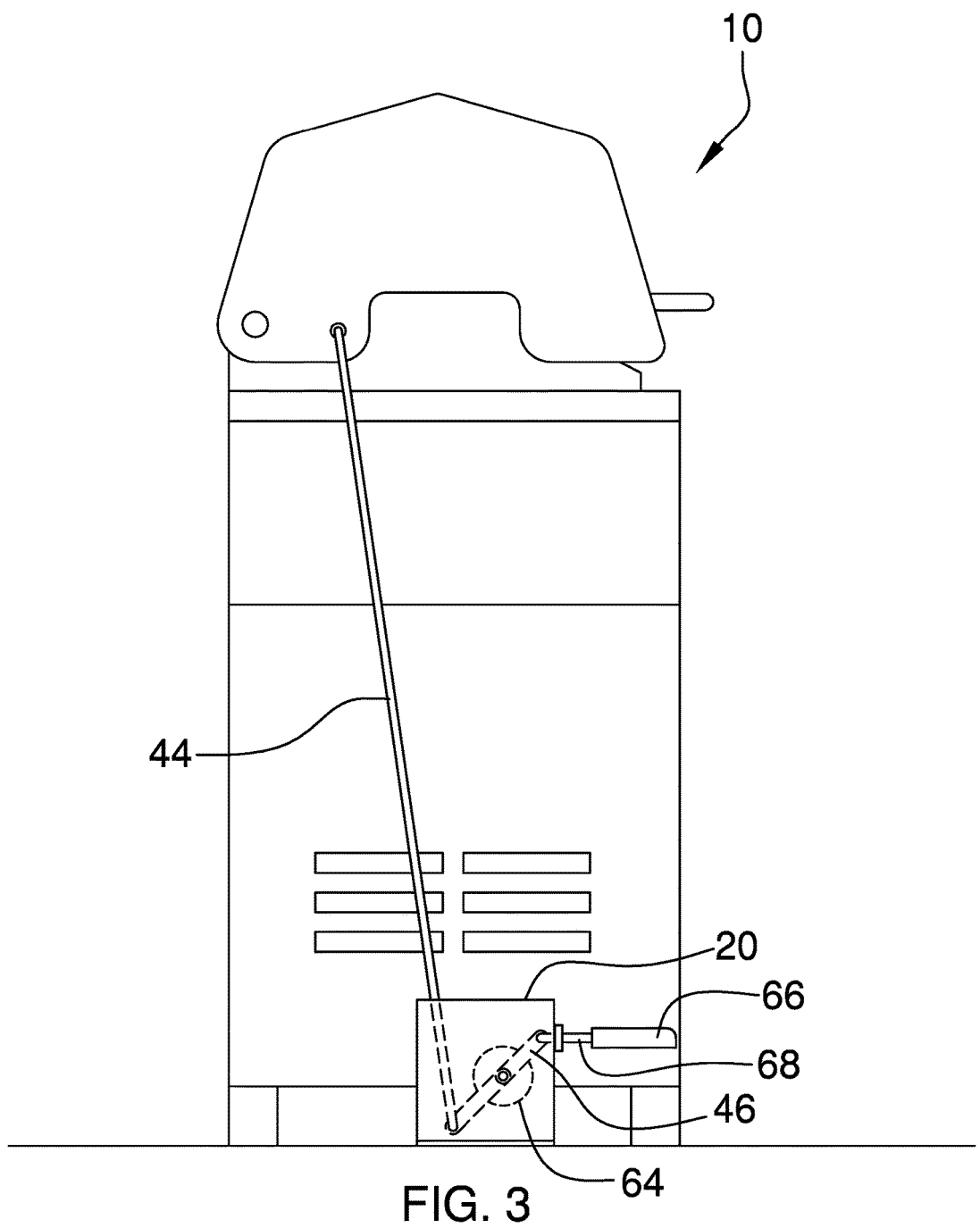
FIG. 3 is a side elevation view showing the cover of the grill in a closed position.

With reference now to the drawings, and in particular FIGS. 1 through 5 thereof, an example of the instant foot-operated grill cover lifting apparatus employing the principles and concepts of the present foot-operated grill cover lifting apparatus and generally designated by the reference number 10 will be described.

Referring to FIGS. 1 through 5 the present foot-operated grill cover lifting apparatus 10 is illustrated. The foot-operated grill cover lifting apparatus 10 includes a rectangular hollow base unit 20 having a top side 22, a bottom side 24, a right side 26, a left side 28, a front side 30, and a back side 32. A slot 34 is vertically disposed on the front side 30 of the base unit 20, and an aperture 36 is disposed on the top side 22 of the base unit 20 proximal the back side 32. A pair of rectangular base support members 38 includes a right base support member 40 and a left base support member 42, with each of the right base support member 40 and the left base support member 42 disposed on each of the right side 26 and the left side 28, respectively, of the base unit 20 immediately adjacent to the bottom side 24. Each of the right base support member 40 and the left base support member 42 is perpendicularly disposed to each of the right side 26 and the left side 28 of the base unit 20. A length of each of the base support members 38 is equal to a length of each of the right side 26 and the left side 28 of the base unit 20 from the front side 30 to the back side 32.

The foot-operated grill cover lifting apparatus 10 further includes a lever rod 44 and a coupling lever arm 46. The lever rod 44 has a top end 48 attached to a left side of a cover of a grill 50 proximal a bottom edge 52 of the cover and a bottom end 54 disposed through the aperture 36. The lever rod 44 is optionally disposed through an opening 56 within a left side table of the grill 58. The coupling lever arm 46 is disposed within the base unit 20, with the coupling lever arm 46 having a front end 60 and a back end 62 rotatably attached to the bottom end 54 of the lever rod 44.

A spring-loaded foot pedal 64, optionally substantially rectangular, has a front foot portion 66 and a rearwardly extended support rod 68 disposed through the slot 34 and rotatably attached to the front end 60 of the coupling lever arm 46. The front foot portion 66 of the spring-loaded foot pedal 64 is configured to lower the front end 60 of the coupling lever arm 46 and raise the back end 62 of the coupling lever arm 46 while simultaneously extending the lever rod 44 upwards in order to raise the cover of the grill 50 when a foot of a user downwardly depresses the front foot portion 66 of the spring-loaded foot pedal 64. The spring-loaded foot pedal 64 is configured to automatically return to its original position when pressure from the foot of the user on the front foot portion 66 of the spring-loaded foot pedal 64 is released.

What is claimed is:

1. A foot-operated grill cover lifting apparatus comprising:
    a rectangular hollow base unit having a top side, a bottom side, a right side, a left side, a front side, and a back side;
    a slot vertically disposed on the front side of the base unit;
    an aperture disposed on the top side of the base unit proximal the back side;
    a pair of rectangular base support members comprising a right base support member and a left base support member, wherein each of the right base support member and the left base support member is disposed on each of the right side and the left side, respectively, of the base unit immediately adjacent to the bottom side;
    wherein each of the right base support member and the left base support member is perpendicularly disposed to each of the right side and the left side of the base unit;
    wherein a length of each of the base support members is equal to a length of each of the right side and the left side of the base unit from the front side to the back side;
    a coupling lever arm disposed within the base unit, the coupling lever arm having a front end and a back end;
    a lever rod having a top end attached to a left side of a cover of a grill proximal a bottom edge of the cover and a bottom end disposed through the aperture, said lever rod being rigid, said back end being rotatably attached to the bottom end of the lever rod wherein movement of said coupling lever arm is translated to said cover of the grill directly by said lever rod; and
    a spring-loaded foot pedal having a front foot portion and a rearwardly extended support rod disposed through the slot and rotatably attached to the front end of the coupling lever arm;
    wherein the front foot portion of the spring-loaded foot pedal is configured to lower the front end of the coupling lever arm and raise the back end of the coupling lever arm while simultaneously extending the lever rod upwards in order to raise the cover of the grill when a foot of a user downwardly depresses the front foot portion of the spring-loaded foot pedal;
    wherein the spring-loaded foot pedal is configured to automatically return to its original position when pressure from the foot of the user on the front foot portion of the spring-loaded foot pedal is released.

2. The foot-operated grill cover lifting apparatus of claim 1 wherein the spring-loaded foot pedal is substantially rectangular.

3. A foot-operated grill cover lifting apparatus comprising:
    a rectangular hollow base unit having a top side, a bottom side, a right side, a left side, a front side, and a back side;
    a slot vertically disposed on the front side of the base unit;
    an aperture disposed on the top side of the base unit proximal the back side; a pair of rectangular base support members comprising a right base support member and a left base support member, wherein each of the right base support member and the left base support member is disposed on each of the right side and the left side, respectively, of the base unit immediately adjacent to the bottom side;
    wherein each of the right base support member and the left base support member is perpendicularly disposed to each of the right side and the left side of the base unit;
    wherein a length of each of the base support members is equal to a length of each of the right side and the left side of the base unit from the front side to the back side;
    a coupling lever arm disposed within the base unit, the coupling lever arm having a front end and a back end;
    a lever rod having a top end attached to a left side of a cover of a grill proximal a bottom edge of the cover and a bottom end disposed through the aperture said lever rod being rigid, said back end being rotatably attached to the bottom end of the lever rod wherein movement of said coupling lever arm is translated to said cover of the grill directly by said lever rod;
    wherein the lever rod is disposed through an opening disposed within a left side table of the grill;
    and
    a substantially rectangular spring-loaded foot pedal having a front foot portion and a rearwardly extended support rod disposed through the slot and rotatably attached to the front end of the coupling lever arm;
    wherein the front foot portion of the spring-loaded foot pedal is configured to lower the front end of the coupling lever arm and raise the back end of the coupling lever arm while simultaneously extending the lever rod upwards in order to raise the cover of the grill when a foot of a user downwardly depresses the front foot portion of the spring-loaded foot pedal;
    wherein the spring-loaded foot pedal is configured to automatically return to its
    original position when pressure from the foot of the user on the front foot portion of the spring-loaded foot pedal is released.

\* \* \* \* \*